United States Patent [19]

Tanaka et al.

[11] Patent Number: 4,984,070

[45] Date of Patent: Jan. 8, 1991

[54] PICTURE QUALITY IMPROVING APPARATUS CAPABLE OF REDUCING DETERIORATION OF INTERPOLATED SIGNAL

[75] Inventors: Seiichi Tanaka, Tokyo; Kouichi Kurihara, Yokohama, both of Japan

[73] Assignee: Kabushiki Kaisha Toshiba, Kawasaki, Japan

[21] Appl. No.: 420,372

[22] Filed: Oct. 12, 1989

[30] Foreign Application Priority Data

Oct. 20, 1988 [JP] Japan ............................ 63-264419

[51] Int. Cl.⁵ ...................... H04N 9/64; H04N 5/213; H04N 7/18
[52] U.S. Cl. ..................................... 358/36; 358/167; 358/105
[58] Field of Search ................. 358/36, 13, 21 R, 140, 358/160, 167

[56] References Cited

U.S. PATENT DOCUMENTS

| | | | |
|---|---|---|---|
| 4,240,106 | 12/1980 | Micheal et al. ...................... | 358/36 |
| 4,242,704 | 12/1980 | Ito et al. ................................ | 358/36 |
| 4,388,729 | 5/1983 | Spencer et al. ...................... | 358/36 |
| 4,658,285 | 4/1987 | Lewis, Jr. ............................. | 358/36 |
| 4,862,267 | 8/1989 | Gillard et al. ....................... | 358/160 |

OTHER PUBLICATIONS

Takehiro Okuyama et al.; "VHS Format Digital HI-FI VCR VC-D900HF"; *NEC Technical Journal;* vol. 40; No. 8; p. 37; Sep. 22, 1987.

Primary Examiner—John K. Peng
Assistant Examiner—Wendy R. Greening
Attorney, Agent, or Firm—Oblon, Spivak, McClelland, Maier & Neustadt

[57] ABSTRACT

A picture quality improving apparatus includes a multiplexer for multiplexing a digital luminance signal and a digital color difference signal upon reception thereof and outputting a first multiplex signal. A noise reduction circuit reduces a noise component from the first multiplex signal and outputs a second multiplex signal. A motion detector receives the first multiplex signal and detects a picture movement signal included in the first multiplex signal. An interpolation signal generator generates a first interpolation signal based on the digital luminance signal and generates a second interpolation signal based on the second multiplex signal. A signal selector selects one of the first and second interpolation signals from the interpolation signal generator in accordance with the picture movement signal detected by the motion detector.

19 Claims, 4 Drawing Sheets

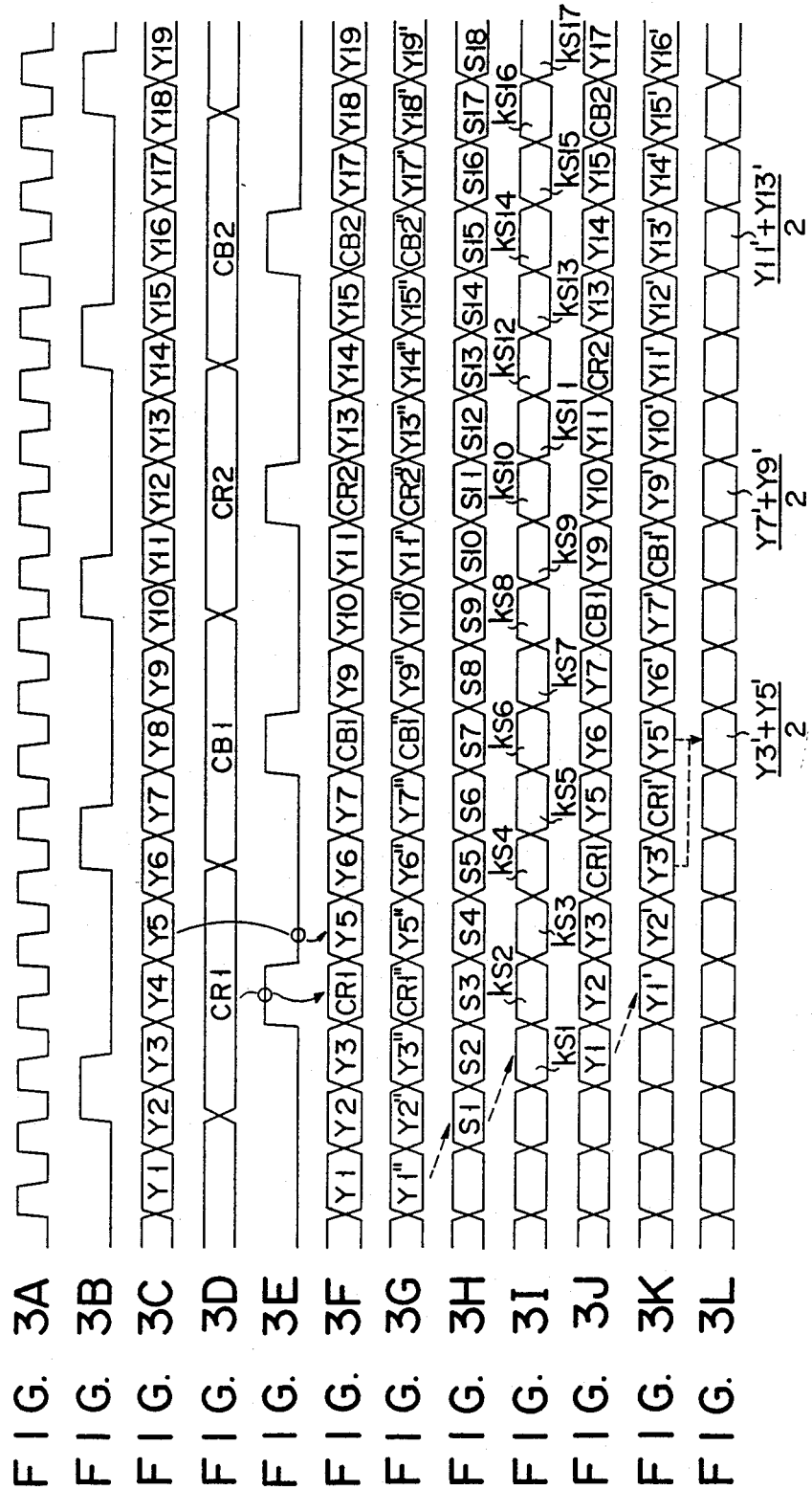

FIG. 3M
FIG. 3N
FIG. 3O
FIG. 3P
FIG. 3Q
FIG. 3R
FIG. 3S
FIG. 3T

PICTURE QUALITY IMPROVING APPARATUS CAPABLE OF REDUCING DETERIORATION OF INTERPOLATED SIGNAL

BACKGROUND OF THE INVENTION

1. Field of the Invention

The present invention relates to a picture quality improving apparatus, and, more particularly, to a picture quality improving apparatus which can reduce deterioration of picture quality caused when subjecting a multiplexed signal to interpolation.

2. Description of the Related Art

For instance, noise reduction is one of picture quality improving techniques for use in video signal processing apparatuses such as video cassette recorders (VCRs). Many of recent video signal processing apparatuses employ digital signal processing for noise reduction. The digital noise reduction is executed by correlating video signals between fields, not between lines. First, a noise signal is detected by using the correlation of video signals between fields and non-correlation of a noise signal between fields. Then, this noise signal is subtracted from the original signal, thus reducing noise. To reduce the circuit scale, prior to noise reduction, a digital color difference signal sample may be multiplexed with a digital luminance signal sample obtained by YC separation and A/D conversion. In this case, since part of a luminance signal sample is thinned out by the multiplexing, an interpolation circuit is required to interpolate the lost portion of the luminance signal sample after noise reduction.

In general there are two interpolation techniques. According to the first technique, in order to interpolate lost portion of a luminance signal sample, those luminance signal samples preceding and succeeding the lost portion ar added together and then divided by two to obtain the average. The second technique is to use a delay circuit to delay a sample that is to be thinned out in a multiplex processing, then puts this sample in an interpolation circuit at a predetermined timing to thereby interpolate lost portion of a luminance signal sample.

Such interpolation circuits, however, have the following shortcomings. Due to the former interpolation circuit having a sort of a low-pass filter characteristic, a high-frequency components is reduced after interpolation. This may blur edge portions of a picture when a video signal represents a fine pattern. With the use of the latter interpolation circuit, when a residual image is produced in noise, reduction processing of a motion picture, the original sample free of a residual image is fit in lost portion, thus causing a vertical line pattern to appear on a picture.

SUMMARY OF THE INVENTION

Accordingly, it is an object of this invention to provide a picture quality improving apparatus capable of reducing deterioration of the picture quality caused in interpolation processing.

To achieve this object, a picture quality improving apparatus according to the present invention comprises:

multiplexing means for multiplexing first and second digital video signals upon reception thereof and outputting a first multiplex signal containing a noise component;

noise reducing means for reducing the noise component from the first multiplex signal from the multiplexing means and outputting a second multiplex signal;

motion detecting means for receiving the first multiplex signal from the multiplexing means and detecting a picture movement signal included in the first multiplex signal; and interpolating means for interpolating the second multiplex signal from the noise reducing means in interpolation mode corresponding to the picture movement signal detected by the motion detecting means.

BRIEF DESCRIPTION OF THE DRAWINGS

The above-mentioned feature and other features of the present invention will be readily apparent from the following description given with reference to the accompanying drawings in which:

FIG. 2 is a diagram for explaining a state in which a digital video signal is multiplexed; and FIG. 3A through 3T are timing charts illustrating generation timings for signals appearing in respective sections of the circuit shown in FIG. 1.

DETAILED DESCRIPTION OF THE PREFERRED EMBODIMENT

A preferred embodiment of this invention will now be described in detail referring to the accompanying drawings.

Figure 1:
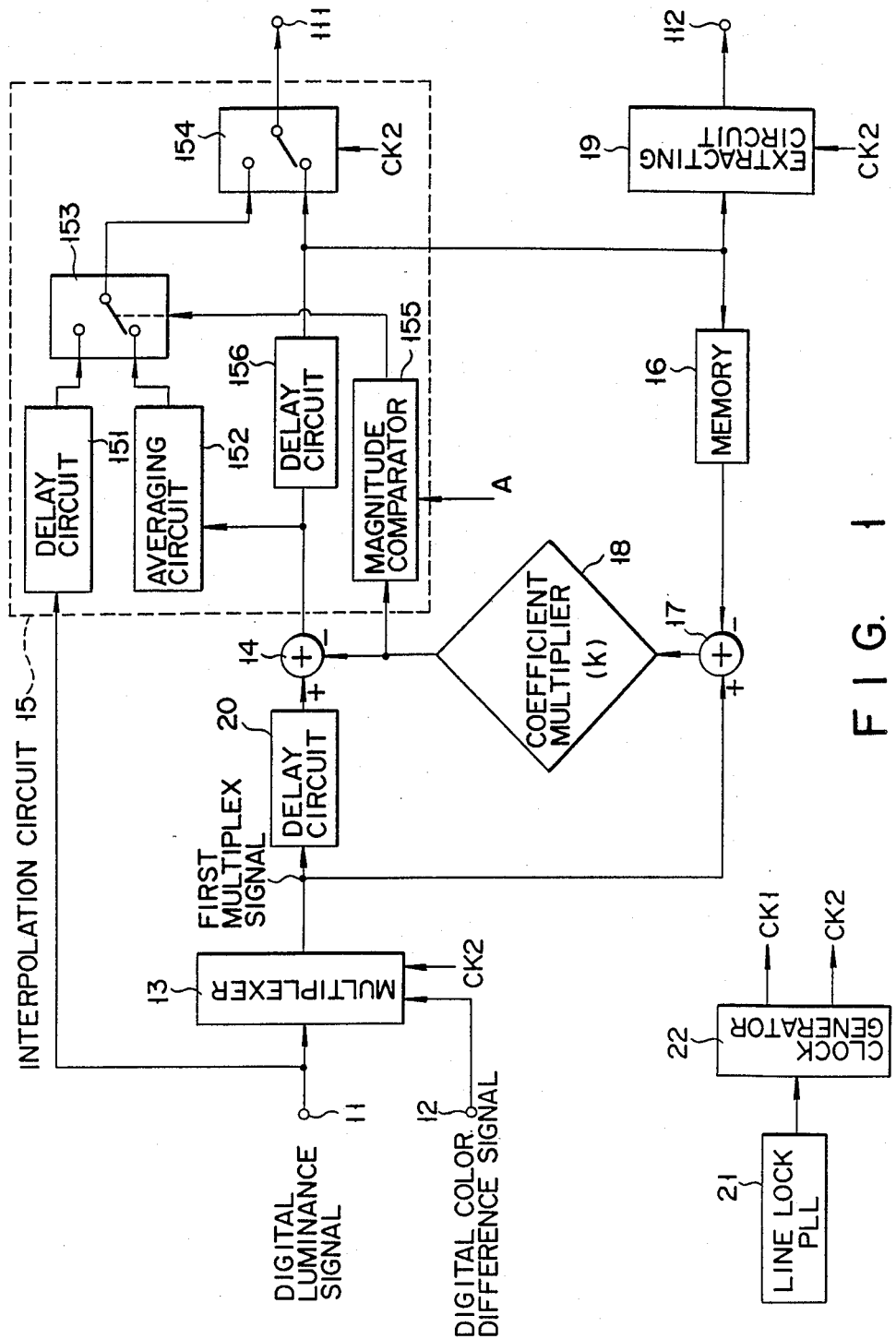
FIG. 1 is a circuit configuration diagram illustrating one embodiment of a picture quality improving apparatus according to the present invention.
Figure 1:
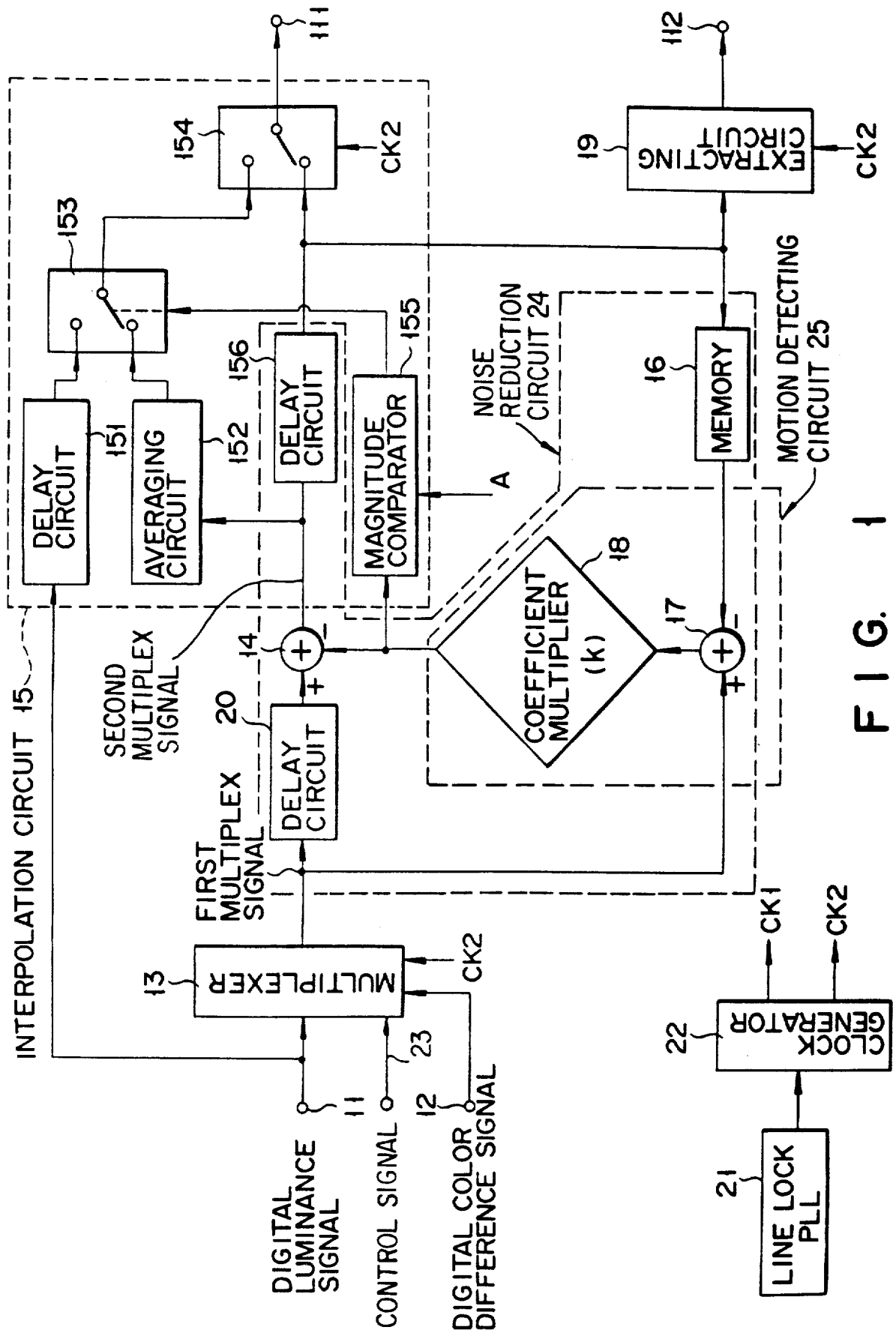

FIG. 1 is a circuit configuration diagram illustrating one embodiment of the present invention. An input terminal 11 receives digital luminance signal separated from a video signal by a Y/C separator (not shown), and an input terminal 12 receives a digital color difference signal separated from the video signal.

The digital luminance signal and digital color difference signal are both input to a multiplexer 13 where a color difference signal sample is fit in for every M samples of the digital luminance signal. Accordingly, the multiplexer 13 provides a first multiplex signal of one system.

FIG. 2 illustrates the state where M equals four, i.e., digital color difference signal samples CR1, B1, CR2, and CB2 are fit in for every four samples of digital luminance signal samples Y1, Y2, Y3, Y4, ... to form one system. Multiplexing digital video signals before executing digital image processing such as noise reduction or adding a special effect can eliminate the need to independently process a luminance signal and a color signal by separate systems. This can reduce the required circuit scale.

A first multiplex signal obtained in the above manner is supplied to an input section of a subtracter 17 as well as to an input section of a subtracter 14 after being delayed by a delay circuit 20. Subtractors 14 and 17, delay circuit 20, memory 16, coefficient multiplier 18 and delay circuit 15b make up noise reduction circuit 24. The subtracter 17 provides the difference between the first multiplex signal and a signal one field previous thereto. That is, the subtracter 17 detects a noise component utilizing such a property of the noise component that it has a non-correlation between fields. The obtained difference is multiplied by a given coefficient by a coefficient multiplier 18, then is supplied as a subtraction factor to the subtracter 14. As a result, the subtracter 14 removes the noise component from the first multiplex signal to provide a second multiplex signal.

The output of the subtracter 14 is input to an interpolation circuit 15 for interpolation of that portion of the digital luminance signal on which a color difference signal sample is superimposed, with a luminance signal sample. The output of the subtracter 14 is also input to a color difference signal extracting circuit 19 for extraction of a color difference signal. The output of the subtracter 1 is also input to a memory 16 for providing a one-field delay; the output of the memory 16 is input to the subtracter 17. The degree of the correlation/noncorrelation between fields or the magnitude of the motion of a video image is detected by the difference obtained by the subtracter 17. This difference is multiplied by k (k: constant) by the coefficient multiplier 18, and is then supplied to a magnitude comparator 155. Subtractor 17 and coefficient multiplier 18 make up motion detecting circuit 25. The color difference signal extracting circuit 19 extracts a color difference signal and sends it to an output terminal 112.

The interpolation circuit 15, which characterizes the present picture quality improving apparatus, prepares two types of interpolation luminance signal samples and selects the proper sample in accordance with the degree of the correlation between fields or the magnitude of the motion of a video image.

The interpolation circuit 15 comprises a delay circuit 151 for delaying a digital luminance signal prior to multiplexing and an averaging circuit 152 for obtaining an average of signal samples preceding and following a sample of the second multiplex signal.

The delay circuit 151 provides first interpolation luminance signal sample, and the averaging circuit 152 a second interpolation luminance signal sample. For instance, to interpolate that portion of the digital luminance signal which corresponds to the luminance signal sample Y4 in FIG. 2, Y4 itself is delayed and output as the first interpolation sample from the delay circuit 151, while an interpolation luminance signal sample, $(Y3+Y5)/2=Y4'$ is provided as the second interpolation sample from the averaging circuit 152.

The interpolation circuit 15 further comprises switches 153 and 154, a magnitude comparator 155, and a delay circuit 156. The switch 153 selects the first or second luminance signal sample in accordance with the signal output from the magnitude comparator 155. The comparator 155 is designed to compare the absolute value of the output from the coefficient multiplier 18 with a reference value A. It outputs a first signal for selecting the output of the delay circuit 151 (i.e., the first luminance signal sample) when the absolute value is less than the reference value A, and outputs a second signal for selecting the output of the averaging circuit 152 (i.e., the second luminance signal sample) when the absolute value is greater than the reference value A.

The first or second luminance signal sample selected by the switch 153 is supplied to the first input terminal of the switch 154. The switch 154 is a selector for replacing the color-difference signal sample of the second multiplexed signal with the luminance signal sample supplied from the switch 153. The switch 154 is operated in synchronism with the same clock signal that controls the multiplexer 13, as is illustrated in the timing chart shown in FIGS. 3A to 3T. This is because the positions are known where the color-difference signal samples have been multiplexed.

Figures 3M, 3N, 3O, 3P, 3Q, 3R, 3S, 3T:
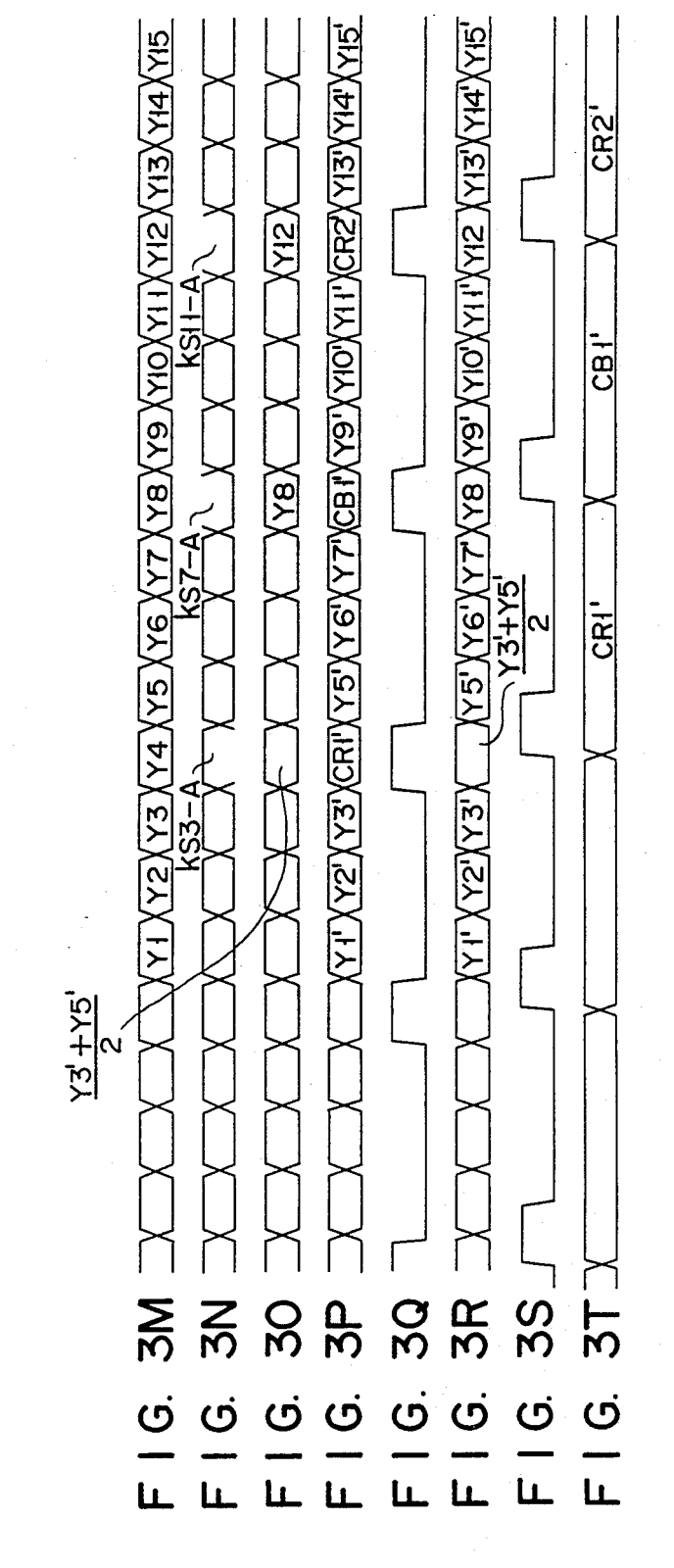

With reference to FIGS. 3A to 3T, it will now be explained when various signals are generated and used in the circuit illustrated in FIG. 1.

First, the line clock PLL 21 supplies timing pulses to the clock generator 22, which generates two types of clock signals CK1 and CK2 which has the waveforms shown in FIGS. 3A and 3B, respectively. The clock signal CK1 is a master clock signal. The clock signal CK2 used as a timing signal for multiplexing a color-difference signal with a luminance signal and extracting the color-difference signal from the luminance signal, and also as a timing signal for interpolating a luminance signal (i.e., a signal for controlling the switch 154). The clock signal CK2 drives the multiplexer 13, the extracting circuit 19, and the switch 154, whereas the clock signal CK1 drives any other active component of the circuit shown in FIG. 1.

A control signal shown in FIG. 3E is supplied to the multiplexer 13 through input terminal 23. This control signal has been produced by delaying the clock signal CK2 by 1.5 clock time of the clock signal CK1. The digital color-difference signal (FIG. 3D) is selected while this control signal remains at the "H" level, and the luminance signal is selected while the control signal remains at the "0" level. As a result, the multiplexer 13 generates a first multiplexed signal which is shown in FIG. 2 and 3F. The subtracter 17 performs its function in synchronism with the clock signal CK1. Its output Si $(=Yi-Yi')$, i.e. the difference between the first multiplexed signal and the output (FIG. 3G) of the memory 16, is supplied with a delay of one-clock time, as can be understood from FIG. 3H. As is evident from FIG. 3I, the output kSi of the coefficient multiplier 18 is delayed by one-clock time of the signal CK1 with respect to the input to the coefficient multiplier 18. The delay circuit 20 delays the first multiplexed signal by the signal-processing time of the subtracter 17 and the multiplier 18 (i.e., two-clock time of the signal CK1), as is shown in FIG. 3J, thereby adjusting the time at which the first multiplexed signal is input to the subtracter 14.

The second multiplexed signal, from which the noise component has been removed, is given as: $Yi'=Yi-kSi$. It is delayed by one-clock time of the signal CK1, as is illustrated in FIG. 3K. The averaging circuit 152 outputs a signal, which is represented as $(Y'_{i-1}+Y'_{i+1})/2$, when the signal $Y'_{i+1}$ is input, as is evident from FIG. 3L. The output signal of the averaging circuit 152 is the second signal for interpolating $Yi'(i=4, 8, 12, 16, \ldots)$, and is actually delayed by one-clock time of the signal CK1.

The delay circuit 151 delays the luminance signal by the total signal-processing time of the delay circuit 20, the subtracter 14, and the averaging circuit 152 (i.e., four-clock time of the signal CK1), thereby generating the first interpolation signal (FIG. 3M). The magnitude comparator 155 is used to control the interpolation of Y4' in accordance with the magnitudes of the noncorrelate components of Y3. Hence, its output is delayed by three-clock time of the signal CK1, i.e., the one-clock time the comparator 155 requires and the two-clock time the subtracter 14 and averaging circuit 152 require, as can be understood from FIG. 3N. As is evident from FIG. 3N, the output of the comparator 155 is at the "H" level when the absolute value of the output of the multiplier 18 is greater than the reference value A.

The switch 153 selects either the first interpolation signal or the second interpolation signal, in accordance with the signal output by the magnitude comparator 155. As is shown in FIG. 30, the switch 153 selects the output of the averaging circuit 152 when the output signal of the comparator 155 is at the "H" level, and selects the output signal of the delay circuit 151 when the output signal of the circuit 152 is at the "L" level. Therefore, the switch 153 selects (Y3'+Y5')/2 as a sample for interpolating Y4', Y8 as a sample for interpolating Y8', and Y12 as a sample for interpolating Y12'.

The delay circuit 156 delays the second multiplexed signal by one-clock time of the signal CK1 equal to the signal-processing time of the averaging circuit 152, as is illustrated in FIG. 3P. The control signal supplied to the switch 154 is generated by delaying the clock signal CK1. The switch 154 selects the output of the switch 153 when this control signal is at the "H" level, and selects the output of the delay circuit 156 when the control signal is at the "L" level. As a result of this, such an interpolated digital luminance signal as is shown in FIG. 3R is generated.

The extraction circuit 19 delays the clock signal CK2, thereby generating the clock signal shown in FIG. 3S. In synchronism with this clock signal, the circuit 19 latches and extracts the color-difference signal from the multiplexed signal output by the delay circuit 156. As a result, such a digital color-difference signal as is shown in FIG. 3T is obtained.

In the timing chart (FIGS. 3A to 3T), the digital luminance signal and the digital color-difference signal have a time-relationship in the input, and another time-relationship in the output. In the output, the digital color-difference signal is delayed very much with respect to the digital luminance signal. The digital luminance signal contained in the output can be delayed, so that the luminance signal and the color-difference signal are set back into the time-relationship identical to that relationship they have in the input.

It will now be described how the switch 153 selects the output of the delay circuit 151 or the output of the averaging circuit 152, in accordance with the signal output by the magnitude comparator 155.

When the absolute value of the signal output by the coefficient multiplier 18 is less than the reference value A, there is no difference or a small difference between the image of the present field and that of the preceding field. Hence, what is being processed is a slow motion picture or a still picture. In this case, a high-fidelity image is obtained by using the original luminance signal sample, rather than the luminance signal sample produced by average-value interpolation. In addition, when the original luminance signal is used, its high-frequency component will not be attenuated.

On the other hand, when the absolute value of the signal output from the multiplier 18 is greater than the reference value A, there is a great difference between the image of the present field and that of the preceding field. Hence, it is quite probable that a motion picture is being processed, and a residual image is likely to appear during the noise-reducing operation. If he original luminance signal sample is used for interpolation, the original component which causes no after images will be interpolated, and the resultant image will appear unnatural. Therefore, in this embodiment, the average value of the two luminance signal samples, one preceding the sample to be interpolated, and the other following this sample, are used for the interpolation, thereby forming an image which appear sufficiently natural, though the high-frequency component is attenuated.

The averaging circuit 152 can find the average value of two or more samples preceding the luminance signal sample to be interpolated, and two or more samples following this luminance signal sample, instead of finding the average value of only two samples preceding and following the sample to be interpolated.

The delay circuit 151 comprises a shift register and a memory. As can be understood from the timing chart (FIGS. 3A to 3T), the delay time of the circuit 151 is determined from the total signal-processing time of the subtracter 14, the delay circuit 20, and the averaging circuit 152. The total signal-processing time of the delay circuit 151 and the averaging circuit 152 is such that the subtracter 17, the coefficient multiplier 18, the magnitude comparator 155, and the switch 153 cooperate to output data at a predetermined time. The switch 153 selects the luminance signal sample for interpolating Y4, in accordance with the difference between the fields in Y3.

In order to cause the switch 153 to select the luminance signal sample for interpolating Y4, not only the difference between the fields in Y3, but also the difference between the fields in Y4 can be used.

As has been explained, the apparatus according to the invention can suppress the deterioration of picture quality resulting from the interpolation performed to reproduce a complex still picture from signals containing high-frequency components or to reproduce a picture which moves fast.

The apparatus according to the invention can also utilize the non-correlation of noise between the frames, in which case the memory 16 is used for obtaining a one-frame delay time, to suppress the deterioration of picture quality

What is claimed is:

1. A picture quality improving apparatus comprising:
    multiplexing means for multiplexing first and second digital video signals upon reception thereof and outputting a first multiplex signal containing a noise component;
    noise reducing means for reducing said noise component from said first multiplex signal from said multiplexing means and outputting a second multiplex signal;
    motion detecting means for receiving said first multiplex signal from said multiplexing means and detecting a picture movement signal included in said first multiplex signal; and
    interpolating means for generating a first interpolating signal based upon said first digital video signal and a second interpolation signal based upon said second multiplex signal from said noise reducing means, and for interpolating said second multiplex signal using one of said first and second interpolation signals selected in accordance with said picture movement signal detected by said motion detecting means.

2. A picture quality improving apparatus according to claim 1, further comprising memory means for delaying said first multiplex signal by one field.

3. A picture quality improving apparatus according to claim 2, wherein said motion detecting means includes subtracting means for outputting a difference between a first multiplex signal in one field and said first multiplex signal one field delayed by said memory means.

4. A picture quality improving apparatus according to claim 3, wherein said motion detecting means further includes a coefficient multiplier for multiplying said difference by a constant.

5. A picture quality improving apparatus according to claim 3, wherein said motion detecting means further includes means for comparing said difference with a predetermined reference value and outputting a comparison result.

6. A picture quality improving apparatus according to claim 5, wherein said interpolating means includes means for generating a first interpolation signal based on said first digital video signal, means for generating a second interpolation signal based on said second multiplex signal and selecting means for selecting one of said first and second interpolation signals in accordance with said comparison result from said comparing means.

7. A picture quality improving apparatus according to claim 6, wherein said means for generating said first interpolation signal includes a circuit for delaying said first digital video signal.

8. A picture quality improving apparatus according to claim 6, wherein said means for generating said second interpolation signal includes means for obtaining an average of samples of said second multiplex signal, preceding and following a sample to be interpolated.

9. A picture quality improving apparatus according to claim 1, further comprising delay means, provided between said multiplexing means and said noise reducing means, for delaying said first multiplex signal.

10. A picture quality improving apparatus according to claim 6, further comprising delay means, provided between said noise reducing means and said selecting means, for delaying said second multiplex signal.

11. A picture quality improving apparatus according to claim 1, further comprising means for extracting said second digital video signal from said second multiplex signal.

12. A picture quality improving apparatus comprising:
reference signal generating means for generating at least two types of reference signals at a predetermined timing;
multiplexing means for multiplexing a digital luminance signal and a digital color difference signal upon reception thereof in response to one of said reference signals and outputting a first multiplex signal containing a noise component;
noise reducing means for reducing said noise component from said first multiplex signal from said multiplexing means and outputting a second multiplex signal;
motion detecting means for receiving said first multiplex signal from said multiplexing means and detecting a picture movement signal included in said first multiplex signal;
interpolation signal generating means for generating a first interpolation signal based on said digital luminance signal and generating a second interpolation signal based on said second multiplex signal from said noise reducing means; and
signal selecting means for selecting one of said first and second interpolation signals from said interpolation signal generating means, in accordance with said picture movement signal detected by said motion detecting means in response to another one of said reference signals from said reference signal generating means.

13. A picture quality improving apparatus according to claim 12, further comprising memory means for delaying said first multiplex signal by one field.

14. A picture quality improving apparatus according to claim 13, wherein said motion detecting means includes subtracting means for outputting a difference between a first multiplex signal in on field and said first multiplex signal one field delayed by said memory means.

15. A picture quality improving apparatus according to claim 14, wherein said motion detecting means further includes a coefficient multiplier for multiplying said difference by a constant.

16. A picture quality improving apparatus according to claim 14, wherein said motion detecting means further includes means for comparing said difference with a predetermined reference value and outputting a comparison result.

17. A picture quality improving apparatus according to claim 12, wherein said interpolation signal generating means includes a circuit for delaying said digital luminance signal.

18. A picture quality improving apparatus according to claim 12, wherein said interpolation signal generating means includes means for obtaining an average of samples of said second multiplex signal, preceding and following a sample to be interpolated.

19. A picture quality improving apparatus according to claim 12, further comprising means for extracting said digital color difference signal from said second multiplex signal.

* * * * *

UNITED STATES PATENT AND TRADEMARK OFFICE
CERTIFICATE OF CORRECTION

PATENT NO. : 4,984,070

DATED : January 8, 1991

INVENTOR(S) : SEIICHI TANAKA ET AL

It is certified that error appears in the above-indentified patent and that said Letters Patent is hereby corrected as shown below:

The drawing sheet, consisting of Fig. 1, should be deleted to be replaced with drawing sheet, consiting Fig. 1, as shown on the attached page.

Signed and Sealed this

First Day of March, 1994

*Attest:*

BRUCE LEHMAN

*Attesting Officer*  *Commissioner of Patents and Trademarks*